Feb. 16, 1954 J. BENZ 2,669,077
APPARATUS FOR PACKAGING PLASTIC MATERIALS
Filed Aug. 24, 1951 3 Sheets-Sheet 2

Inventor
Johannes Benz
By

Feb. 16, 1954   J. BENZ   2,669,077
APPARATUS FOR PACKAGING PLASTIC MATERIALS
Filed Aug. 24, 1951   3 Sheets-Sheet 3
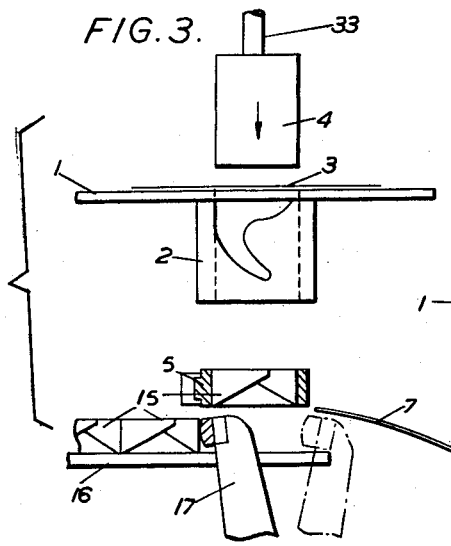
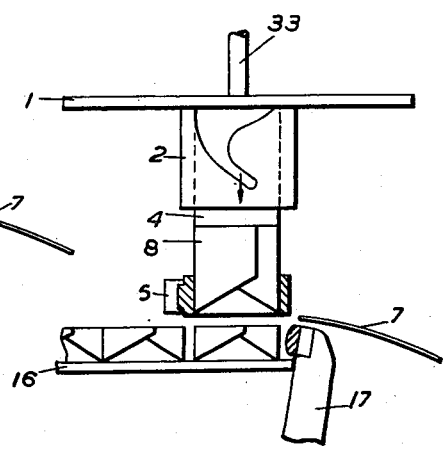
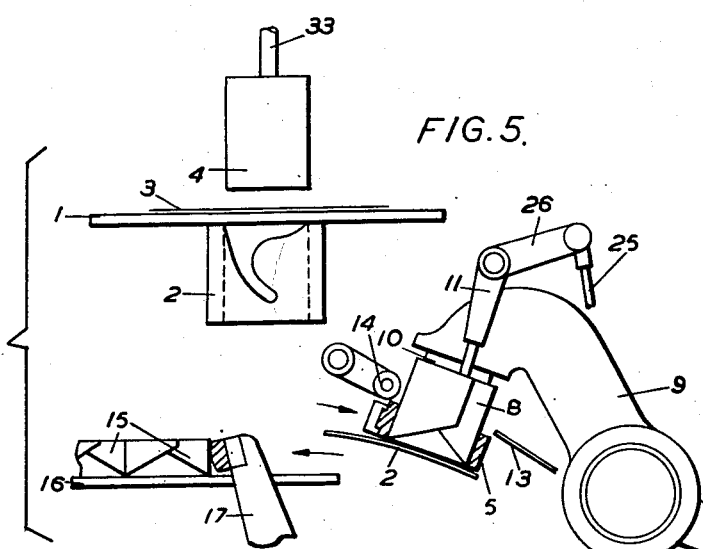
Inventor
Johannes Benz
By Patented Feb. 16, 1954

2,669,077

UNITED STATES PATENT OFFICE 2,669,077

APPARATUS FOR PACKAGING PLASTIC MATERIALS

Johannes Benz, Dusseldorf, Germany

Application August 24, 1951, Serial No. 243,475

Claims priority, application Germany August 25, 1950

8 Claims. (Cl. 53—95)

The present invention is concerned with automatic apparatus for packaging plastic materials, such as butter, fat, jam, soft soap, and other dough-like or semi-solid substances.

The operation of known machines for this purpose has involved the steps of charging a predetermined quantity of the plastic mass to be packaged directly into a pre-folded wrapper which is open at one side and then closing the wrapper by means of folders, rollers or the like.

Thus, the paper or other web-like material (hereinafter to be understood as included in the term "paper") constituting the wrapper was pre-folded by means of a die and inserted into a mould in the pre-folded condition. Thereafter this mould was moved to a charging station and the pre-folded wrapper there charged with plastic material, whereupon the mould was moved to a station in which the wrapper was closed; at a subsequent station the packaged material was knocked out of the mould on to a conveyor belt or the like, and the empty mould returned to the starting position, and the cycle repeated.

In such machines the proper sequence of operations was obtained by operating the various stages of the machines from a common drive by means of a system of cam-controlled levers or the like.

It is known, in such packaging machines, to arrange the mould on a rotary table so that, during one complete rotation of this table, the mould passes through all the said various stations. This enables as many moulds to be provided on the table as there are stations, so that a completely wrapped package is discharged from the machine for every step in the rotation of the table.

These known packaging machines are very complicated in construction and therefore costly; however, they have a large output and are therefore of advantage for large-scale packaging activities. In the case of small-scale production on the other hand, machines of this calibre are not an economic proposition since they cannot usually be operated continuously at full capacity. For this reason, it is preferable under these circumstances to employ simpler and less expensive machines which work with one mould only, their mould reciprocating between the said charging and the delivery stations.

A primary object of the present invention is to simplify packaging machines, particularly machines of the kind referred to above, whether for use in small—or large—scale working, by reducing the number of stations to or through which the mould or moulds has or have to pass.

To this end, and according to the present invention, there is provided a machine comprising a mould adapted to move between a first station at which it receives a pre-folded wrapper open at one side and a charging station at which said pre-folded wrapper is charged with a portion of said plastic material; and means at the said first station for placing a pre-folded wrapper into the said mould whilst simultaneously discharging from the mould a package carried thereby from said charging station.

Conveniently, the said mould is adapted to alternate between said first and charging stations and the machine includes means for forming a pre-folded wrapper from a sheet of wrapper material. Thus according to a further aspect, this invention provides a machine comprising a mould adapted to alternate between a first station and a second or charging station; means at said first station for forming, from a sheet of wrapper material, a pre-folded wrapper open at one side and for inserting such wrapper into the said mould, said pre-folded wrapper receiving a portion of said plastic material at said charging station when carried thereto by said mould; and said means for inserting a pre-folded wrapper into the mould at said first station also serving to effect the simultaneous discharge from the mould of a package carried thereby from said charging station.

Preferably, and in accordance with a further feature of this invention, the said mould comprises a frame open at two opposite ends; and said means for inserting a pre-folded wrapper into such mould and for effecting discharge of a package therefrom include a plunger or die reciprocable into and out of said frame.

A construction in accordance with the present invention eliminates the necessity for a separate device hitherto essential for knocking-out the packages from the mould, and consequently obviates one of the stations previously required, resulting in a substantial simplification of the machine and economy in cost.

An embodiment of the invention is illustrated, by way of example, in the accompanying drawings, in which:

Figure 3 shows the arrangement for pre-folding the wrapper, with a package, already folded, in the mould.

Figure 4 illustrates the arrangement shown in Figure 3, but at the instant when the completed package has been pushed out of the mould and a freshly prepared wrapper has been inserted in the mould.

Figure 5 shows diagrammatically a portion of the machine of Figure 1, at the instant when the prepared wrapper is charged with the plastic material, the mould having been pivoted to the charging station.

Figure 1:
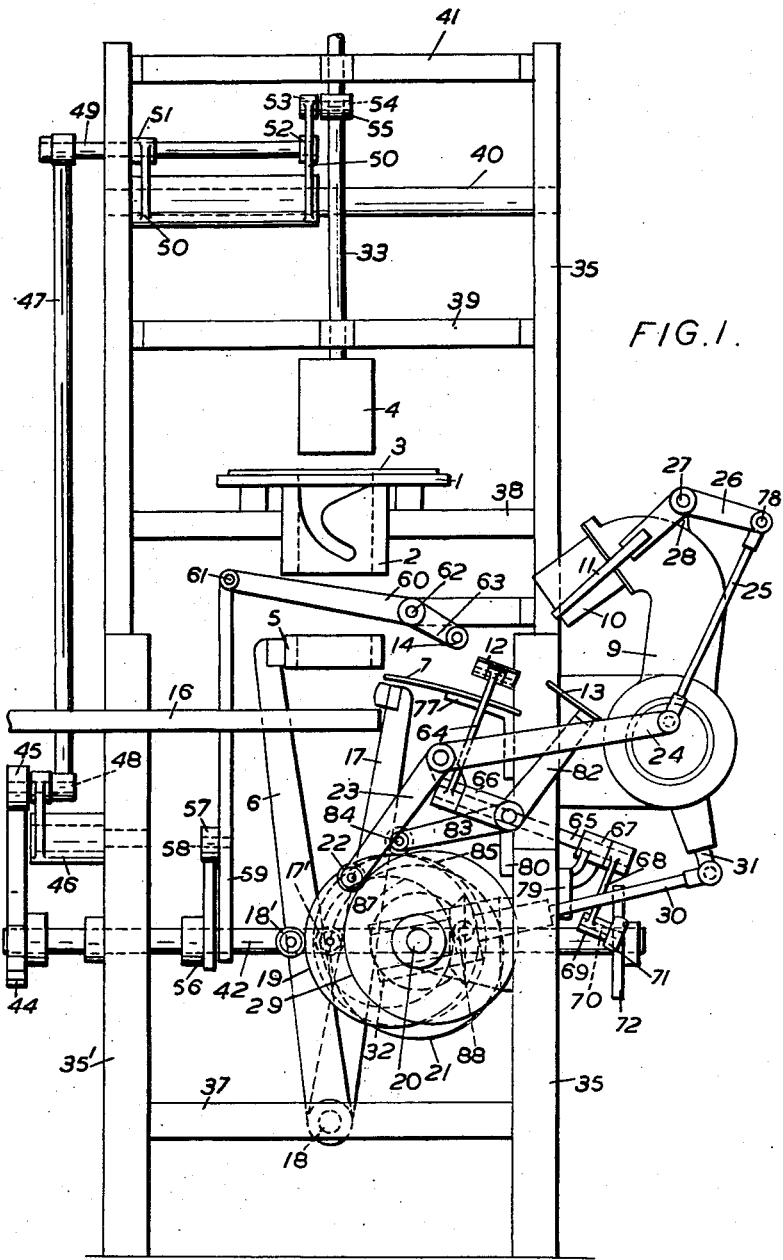
Figure 1 shows a packaging machine, constructed in accordance with the invention, and having a mould reciprocable between the aforesaid first and charging stations.
Figure 2:
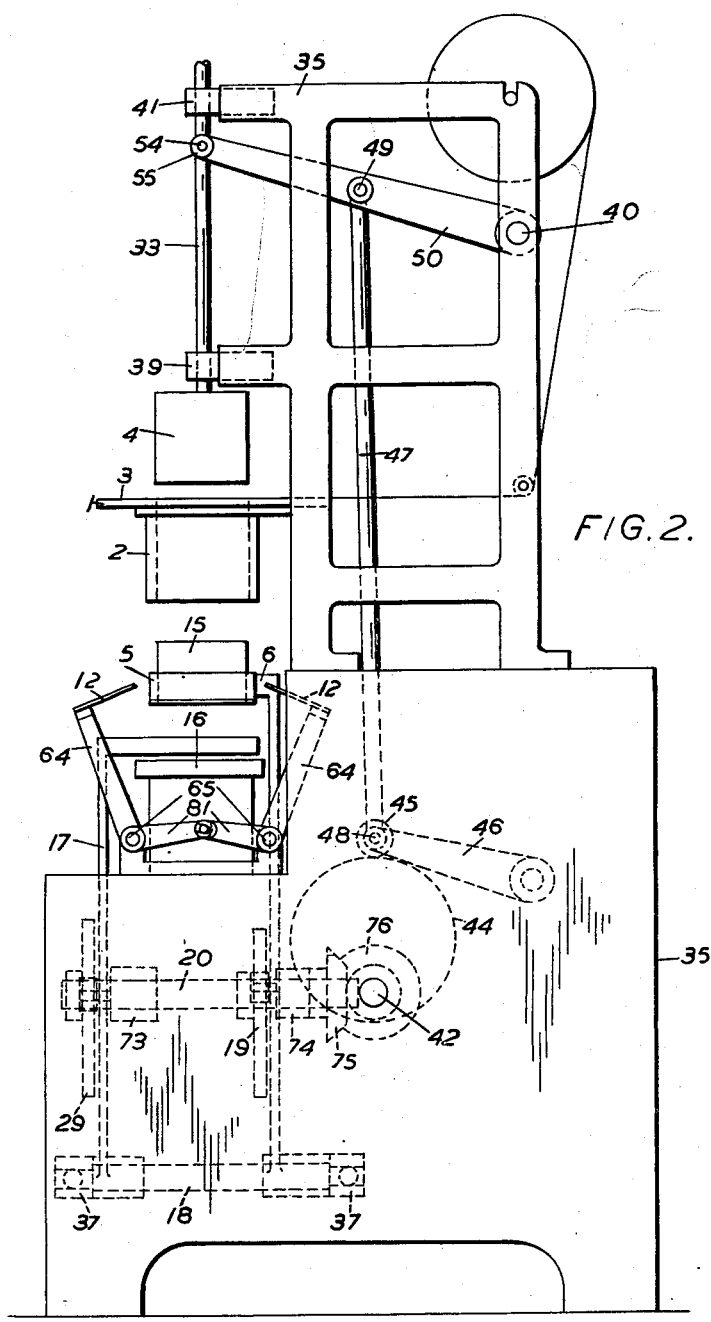
Figure 2 shows the machine shown in Figure 1 as seen from the side, certain parts being omitted in order not to complicate the representation.

The packaging machine shown in Figures 1 and 2 comprises a frame formed by two frame stands 35 and 35' which are spaced from each other by a number of cross members 37, 38, 39, 40 and 41. The main driving shaft 20 is mounted in bearings 73, 74, shown in dotted lines in Figure 2, and is driven in any suitable manner by a driving motor. The driving shaft 20 carries a bevel wheel 75 which drives, through a second bevel wheel 76, a shaft 42 journalled in the frame stands 35, 35'.

The shaft 42 is furnished with a cam disc 44 which co-operates with a roller 45 mounted on a bolt 48. Bolt 48 is carried by a pivoted lever 46 which during the rotation of the cam disc 44, is rocked up and down and thus moves the connecting rod 47 upwards and downwards. The movement of the connecting rod 47 is transmitted to a double lever 50 by the bolt 49, which is pivoted to the two hubs 51 and 52 of the double lever 50.

The said lever 50 is pivotally mounted on the cross member 40 and is furnished at its free end remote from the connecting rod 47 with a boss 53 carrying a bolt 54, which, by means of the fulcrum block 55, transmits the movement of the lever to the plunger rod 33, the rod 33 thus being reciprocated and carrying at its lower end a plunger 4. The rod 33 is guided so as to be axially displaceable in the cross members 39 and 41.

The reference 1 denotes an apertured template or support which is carried by the cross member 38. Beneath the aperture in the template 1 is arranged a folder box or guide 2, the latter being open at its upper and lower ends.

An accurately-dimensioned sheet 3 of wrapper material, e. g. paper, is positioned on the template 1, over the aperture therein by means of a feeding and cutting device, not shown in the drawings. During the downward movement of the plunger 4, the external cross-sectional shape of which is such that it fits closely within the folder box 2, the sheet of paper 3 is pressed into the said box and in this manner is pre-folded.

A mould 5, in the form of a frame open at its upper and lower ends, is movable along a slideway 7 by means of a pivoted arm 6 between the first station in which it is located immediately below the folder box 2 and a charging station in which it is located below the nozzle 10 of a charging head 9 (see Figure 5).

The oscillation of the mould 5 between the said first and charging stations is effected by rocking the said arm 6 about a shaft 18 to which its lower end is pivotally secured. The arm 6 is furnished with a roller 18' which co-operates with a cam 19 on the driving shaft 20 and effects displacement of the arm 6 to the left as seen in Figure 1; movement of the arm to the right may be effected by any suitable means, for example a further roller and cam or by spring or other suitable resilient means.

When the mould 5 is at the first said station, as will be seen from Figures 3 and 4, the plunger 4 descends through the aperture in the template 1 and carries with it the sheet of paper 3 which by means of the folder box 2, is pre-folded and on continued descent of the plunger 4 is inserted into the mould 5. During the latter part of the descent of the plunger 4, a previously-wrapped package carried by the mould 5 is driven downwardly out of the mould on to a table 16.

The plunger 4 is then withdrawn upwardly to its starting position and the mould 5 is moved to the said charging station.

The charging head 9 is pivotally carried by a bracket on the frame stand 35. By means of the arm 31 and the connecting rod 30 which is reciprocated in timed relationship with the mould 5 and plunger 4, the head 9 is swung into position over the mould when this has carried a pre-folded wrapper to the charging station. The reciprocation of the connecting rod 30 is effected by a roller 89 carried at the end of the rod 30 remote from the arm 31 engaging a cam disc 87 carried by the driving shaft 20, a pair of arms 32 at the said end of the rod 30 embracing the shaft 20 and guiding the movement of the rod 30.

When the head 9 has been swung over the mould 5, a measured quantity of the plastic material to be packaged is forced into the pre-folded wrapper carried by the mould; then a stripper 11 is swung across the orifice of the nozzle 10 to separate the quantity of material to be packaged from that in the said nozzle. The stripper 11 is operated through the lever system 23, 24, 25 and 26 by means of a roller 22 carried by the end of the lever 23 co-operating with a cam 21 on the driving shaft 20. The cranked lever 26, as clearly seen in Figure 1, is pivoted at 27 to a lug 28 on the head 9 and consequently moves therewith.

After a charging operation, the head 9 is swung back to the position shown in Figure 1.

The open side of the charged wrapper has now to be closed, and this is effected by folding the upstanding flaps of the wrapper upon the top of the plastic material therein.

Thus two side flap-folding devices 12 are arranged to sweep inwardly across the top of the said material and to fold down the adjacent side flaps of the wrapper. The said devices 12 each consist of a plate carried by a lever 64 secured to a shaft 65, the cranked end portions 81 of the levers 64 being coupled together so that the levers move in unison when the shafts 65 are rotated.

Each of the shafts 65 is journalled at 66 and 67 in bearings carried by brackets 80 and 79 respectively on the frame stand 35. A lever 68 is secured to each shaft 65 at the end thereof remote from the lever 64, the said levers 68 being furnished at their free ends with a boss 69 carrying a roller spindle 70 supporting a roller 71 which co-operates with a cam 72 carried by the aforesaid shaft 42.

After the devices 12 have folded down the side flaps of the wrapper and have returned to their initial position, the rear flap is folded down by a forward movement of the folder 13.

The folder 13 is carried by a pivoted lever 82 having a cranked portion 83 carrying a roller 84 at its free end, the roller 84 co-operating with a cam 85 on the driving shaft 20.

The remaining flap of the wrapper is folded down by means of a roller 14 which sweeps the upper surface of the package when the mould 5 is returning to the said first station. Thus the roller 14 is carried by a lever 63 pivoted at 62 to a bracket on the frame stand 35, the arm 60 of the lever 63 being pivotally connected to a link 59 which is reciprocated vertically by means of a roller 57 on a pin 58 carried by link 59 co-operating with a cam 56 on the shaft 42. The roller 14 is raised clear of the flaps of a pre-folded wrapper when the latter is carried from the first station to the charging station, and is lowered when the mould is about to return with a charged package from the charging station to the said first station.

The aforesaid shaft 18 also has pivoted thereto a lever 17 furnished with a roller 17' co-operating with a cam 29, and the lever 17 is thus oscillated about the shaft 18 in timed relationship with the other operations of the machine. The lever 17 carries at its upper end a lateral extension which is adapted to sweep over the said table 16 when the lever 17 is rocked to the left as seen in Figures 1, 3, 4 and 5, and to sweep packages expelled from the mould 5 across the table 16.

It will of course be understood that the various operations of the machine can be effected in any suitable manner, the particular cam and lever arrangements illustrated in Figures 1 and 2 merely being given as an example of the way in which the parts can be driven.

I claim:

1. A machine for packaging plastic material and having at least two operating stations, such machine comprising a mould open at its upper and lower ends for receiving, at a first station, a pre-folded wrapper; first means for oscillating said mould between said first station and a charging station disposed sidewardly from the said first station where the said wrapper receives a portion of the material to be packaged and for returning said mould to the said first station; second means at said first station for inserting a wrapper in said mould when at the said first station, and for simultaneously acting on a filled package carried by the mould from the charging station, and discharging the filled package from the mould.

2. A machine for packaging plastic material and having at least two operating stations such machine comprising a mould, open at its upper and lower ends, for receiving, at a first station, a pre-folded wrapper; means for oscillating said mould between said first station and a charging station disposed sidewardly from the said first station where the said wrapper receives a portion of the material to be packaged and for returning said mould to the said first station; a die located at said first station and means for reciprocating said die into and out of said mould when at the said first station to insert a wrapper therein, and for simultaneously acting on a filled package carried by the mould from the charging station, and discharging the filled package from the mould.

3. A machine for packaging plastic material and having at least two operating stations, such machine comprising a mould, open at its upper and lower ends, for receiving, at a first station, a pre-folded wrapper; an arm carrying said mould, said arm being oscillatable to move the mould alternately between said first station and a charging station where the said wrapper receives a portion of the material to be packaged; a die located at said first station and means for reciprocating said die into and out of said mould when at the said first station to insert a wrapper therein, said die being adapted simultaneously to act on a filled package carried by the mould from the charging station, thereby to discharge the filled package from the mould.

4. A machine for packaging plastic material and having at least two operating stations, such machine comprising a mould open at its upper and lower ends for receiving, at a first station, a pre-folded wrapper; means for oscillating said mould between said first station and a charging station disposed sidewardly from the said first station where the said wrapper receives a portion of the material to be packaged and for returning said mould to the said first station; a die located at said first station and means for moving said die in co-operating relation with said mould when at the said first station to insert a wrapper therein, and for simultaneously acting on a filled package carried by the mould from the charging station, thereby discharging the filled package from the mould; and means co-operating with said die to pre-fold said wrapper from a sheet of wrapper material prior to its insertion by the die into the mould.

5. A machine according to claim 4, in which the wrapper pre-folding means comprises an apertured plate for receiving a sheet of wrapper material and a tubular guide located behind said aperture and having a sliding fit with the die.

6. A machine for packaging plastic material and having at least two operating stations, such machine comprising a mould, open at its upper and lower ends, for receiving, at a first station, a pre-folded wrapper; an arm carrying said mould, said arm being oscillatable to move the mould alternately between said first station and a charging station where said wrapper receives a portion of material to be packaged; a die located at said first station and means for reciprocating said die into and out of said mould when at the said first station to insert a wrapper therein, said die being adapted simultaneously to act on a filled package carried by the mould from the charging station, thereby to discharge the filled package from the mould; and means for operating said arm and said die in timed relation.

7. A machine according to claim 6, further including charging means for delivering a portion of plastic material into the wrapper in the mould at the charging station; and means for operating said charging means in timed relation with said arm and said die.

8. A machine according to claim 7, further including reciprocable means assisting in completion of the closure of a package in its travel between the charging and said first stations, and means for reciprocating these closure means in timed relation with the charging means, arm, and die.

JOHANNES BENZ.

References Cited in the file of this patent

UNITED STATES PATENTS

| Number | Name | Date |
|---|---|---|
| 616,452 | Campbell | Dec. 27, 1898 |
| 1,151,233 | Anderson | Aug. 24, 1915 |
| 1,295,951 | Armstrong | Mar. 4, 1919 |

FOREIGN PATENTS

| Number | Country | Date |
|---|---|---|
| 615,100 | Great Britain | Dec. 31, 1948 |